United States Patent
Cantor et al.

(12) 
(10) Patent No.: US 12,372,048 B2
(45) Date of Patent: Jul. 29, 2025

(54) SEAL FOR GIMBALING AND/OR FIXED ROCKET ENGINE NOZZLES, AND ASSOCIATED SYSTEMS AND METHODS

(71) Applicant: Blue Origin Manufacturing, LLC, Huntsville, AL (US)

(72) Inventors: Nathaniel Cantor, Seattle, WA (US); Colin Patterson, Seattle, WA (US); Adam Norman, Maple Valley, WA (US); Christopher P. Hupf, Maple Valley, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 17/837,992

(22) Filed: Jun. 10, 2022

(65) Prior Publication Data
US 2022/0364527 A1 Nov. 17, 2022

Related U.S. Application Data

(63) Continuation of application No. 16/813,197, filed on Mar. 9, 2020, now Pat. No. 11,391,243.

(51) Int. Cl.
*F02K 1/80* (2006.01)
*F02K 1/12* (2006.01)
(Continued)

(52) U.S. Cl.
CPC ............ *F02K 1/805* (2013.01); *F02K 1/1223* (2013.01); *F02K 9/343* (2013.01); *F02K 9/97* (2013.01);
(Continued)

(58) Field of Classification Search
CPC .......... F02K 1/1223; F02K 1/15; F02K 1/805; F02K 9/343; F02K 9/84; F02K 9/97; F05D 2240/57; F05D 2300/50212
See application file for complete search history.

(56) References Cited

U.S. PATENT DOCUMENTS

| 18,058 A | 8/1857 | Raymond et al. |
| 965,052 A | 7/1910 | Wainwright |

(Continued)

FOREIGN PATENT DOCUMENTS

| DE | 10058339 A1 | 6/2002 |
| EP | 0741655 A1 | 11/1996 |

(Continued)

OTHER PUBLICATIONS

Aerospace America, "The 787 and the A350 Teasing out the Facts," Publication of the American Institute of Aeronautics and Astronautics, Jun. 2009, 3 pages.

(Continued)

*Primary Examiner* — Andrew H Nguyen
(74) *Attorney, Agent, or Firm* — Hogan Lovells US LLP

(57) ABSTRACT

Seals for gimbaling and/or fixed rocket engine nozzles, and associated systems and methods are disclosed. A representative rocket propulsion system includes a rocket engine having an exhaust nozzle, a seal plate carried by the exhaust nozzle, and a seal engaged with the seal plate. The seal includes at least one support, multiple pivotable first flaps, carried by the at least one support and positioned to contact the seal plate, and multiple pivotable second flaps, with an individual second flap positioned to shield a corresponding individual first flap. At least one forcing element is operatively coupled to at least one of the individual first flap or the individual second flap, to apply a pivoting force to the at least one of the individual first flap or the individual second flap.

20 Claims, 10 Drawing Sheets

(51) Int. Cl.
*F02K 9/34* (2006.01)
*F02K 9/97* (2006.01)

(52) U.S. Cl.
CPC ...... *F02K 1/1207* (2013.01); *F05D 2240/128* (2013.01); *F05D 2250/31* (2013.01); *F05D 2250/324* (2013.01); *F05D 2260/50* (2013.01)

(56) References Cited

U.S. PATENT DOCUMENTS

| | | | |
|---|---|---|---|
| 1,595,300 A | 8/1926 | Halloran | |
| 2,037,663 A | 4/1936 | Lalor | |
| 2,043,337 A | 6/1936 | Smith | |
| 2,243,711 A | 5/1941 | Lamb | |
| 2,307,273 A | 1/1943 | Hughes | |
| 2,870,599 A | 6/1959 | Long et al. | |
| 2,954,047 A | 9/1960 | Syrucek | |
| 3,140,584 A * | 7/1964 | Ritchey | F02K 9/84 60/253 |
| 3,159,179 A | 12/1964 | Lain | |
| 3,285,520 A * | 11/1966 | Johnson | F02K 9/84 239/265.35 |
| 3,329,396 A | 7/1967 | Heaton | |
| 3,438,316 A | 4/1969 | Rodier | |
| 3,451,625 A * | 6/1969 | Fruktaw | F02K 9/84 285/267 |
| 3,787,022 A | 1/1974 | Wilcox | |
| 3,828,551 A | 8/1974 | Schmidt | |
| 3,912,172 A | 10/1975 | Bolner | |
| 4,057,072 A | 11/1977 | Cook | |
| 4,091,838 A | 5/1978 | Dowty | |
| 4,094,492 A | 6/1978 | Beeman et al. | |
| 4,104,877 A * | 8/1978 | Bone | F02K 9/84 60/230 |
| 4,184,238 A | 1/1980 | Carey | |
| 4,350,179 A | 9/1982 | Bunn | |
| 4,398,558 A | 8/1983 | Cadeddu | |
| 4,513,948 A | 4/1985 | Konig | |
| 4,641,782 A * | 2/1987 | Woodward | F02K 1/62 239/265.29 |
| 4,796,839 A | 1/1989 | Davis | |
| 4,811,182 A | 3/1989 | Solomon | |
| 4,964,340 A | 10/1990 | Daniels et al. | |
| 4,970,857 A * | 11/1990 | Faupell | F02K 9/92 239/265.31 |
| 5,033,519 A | 7/1991 | Puffer et al. | |
| 5,101,662 A | 4/1992 | Fisher | |
| 5,129,602 A | 7/1992 | Leonard | |
| 5,568,901 A | 10/1996 | Stiennon | |
| 5,619,851 A * | 4/1997 | Johnson | F02K 9/97 239/265.17 |
| 5,667,167 A | 9/1997 | Kistler | |
| 5,678,784 A | 10/1997 | Marshall, Jr. et al. | |
| 5,765,361 A | 6/1998 | Jones et al. | |
| 5,806,725 A | 9/1998 | Bennett | |
| 5,927,653 A | 7/1999 | Mueller et al. | |
| 6,039,325 A | 3/2000 | Steinetz et al. | |
| 6,402,091 B1 | 6/2002 | Hansen | |
| 6,457,306 B1 | 10/2002 | Abel et al. | |
| 6,513,760 B1 | 2/2003 | Mueller et al. | |
| 6,668,543 B2 | 12/2003 | Linner | |
| 6,945,498 B2 | 9/2005 | Mueller et al. | |
| 7,000,402 B2 | 2/2006 | Benians | |
| 7,389,636 B2 | 6/2008 | Fowler et al. | |
| 8,047,472 B1 | 11/2011 | Brand et al. | |
| 9,217,389 B1 | 12/2015 | Lee | |
| 11,391,243 B1 | 7/2022 | Cantor | |
| 2002/0059955 A1 | 5/2002 | LaFleur | |
| 2004/0150165 A1 * | 8/2004 | Grondahl | F01D 11/02 277/355 |
| 2006/0049316 A1 | 3/2006 | Antonenko et al. | |
| 2007/0012820 A1 | 1/2007 | Buehler | |
| 2009/0302252 A1 | 12/2009 | Cheung | |
| 2010/0326045 A1 | 12/2010 | Lai | |
| 2011/0302905 A1 | 12/2011 | Weinberg et al. | |
| 2016/0076391 A1 * | 3/2016 | Guinn | F02C 7/28 277/591 |
| 2018/0119830 A1 | 5/2018 | Graham | |
| 2018/0298924 A1 * | 10/2018 | Le Coq | F02K 1/763 |
| 2019/0249869 A1 * | 8/2019 | Glover | F23D 11/383 |

FOREIGN PATENT DOCUMENTS

| | | |
|---|---|---|
| EP | 1340316 A1 | 9/2003 |
| EP | 2308636 B1 | 5/2012 |

OTHER PUBLICATIONS

Hulka et al., Modification and Verification Testing of a Russian NK-33 Rocket Engine for Reusable and Restartable Applications, AIAA 98-3361, 1998, 26 pages.

* cited by examiner

SEAL FOR GIMBALING AND/OR FIXED ROCKET ENGINE NOZZLES, AND ASSOCIATED SYSTEMS AND METHODS

CROSS-REFERENCE TO RELATED APPLICATION

The present application is a continuation of U.S. Provisional application Ser. No. 16/813,197, filed Mar. 9, 2020 and incorporated herein by reference. To the extent the foregoing application and/or any other materials conflict with the present disclosure, the present disclosure controls.

TECHNICAL FIELD

The present disclosure is directed generally to seals for gimbaling and/or fixed rocket engine nozzles, and associated systems and methods.

BACKGROUND

Rockets have been used for many years to launch human and non-human payloads into orbit. Such rockets delivered the first humans to space and to the moon, and have launched countless satellites into the Earth's orbit and beyond. Such rockets are used to propel unmanned space probes and more recently to deliver structures, supplies, and personnel to the orbiting international space station.

One continual challenge associated with rocket missions is providing sufficient control authority during all phases of rocket operations. One approach to addressing this challenge is to provide the rocket with gimbaled rocket engines that can change the direction in which they direct rocket thrust, so as to stabilize and/or redirect the rocket. One challenge associated with gimbaled rocket engines is to properly seal the interface between the engine nozzle and the rocket, despite the movement of the engine nozzle relative to the rocket. Another challenge is protecting the base area of a re-useable rocket that reenters the atmosphere and lands tail first. Aspects of the present disclosure are directed to addressing this challenge.

DETAILED DESCRIPTION

Embodiments of the technology disclosed herein are directed generally to seals for gimbaling and/or fixed rocket engine nozzles, and associated systems and methods. In particular embodiments, the seal can include multiple, overlapping (e.g., shingled) flaps that protect the interior of a reusable rocket stage as it descends through the atmosphere for landing and reuse. The overlapping seals can include one flap that provides a physical seal at the interface between the engine nozzle and the base heat shield of the rocket, and a second flap that provides heat protection for the first flap, and provides for shingling. One or more of the flaps can be biased against the heat shield (either directly, or by acting on an overlapping flap) so as to maintain the integrity of the seal, even as the engine and nozzle move. Such movement may be deliberate, for example, in the case of a gimbaling engine nozzle, and/or the result of changes in the nozzle dimensions and/or positions, e.g., as the nozzle expands and contracts under thermal loads and/or structural deformation.

Several details describing structures and processes that are well-known and often associated with such seals are not set forth in the following description to avoid obscuring other aspects of the disclosure. Moreover, although the following disclosure sets forth several embodiments, several other embodiments can have different configurations, arrangements, and/or components than those described in this section. In particular, other embodiments may have additional elements, and/or may lack one or more of the elements described below with reference to FIGS. 1-8F.

Figure 1:
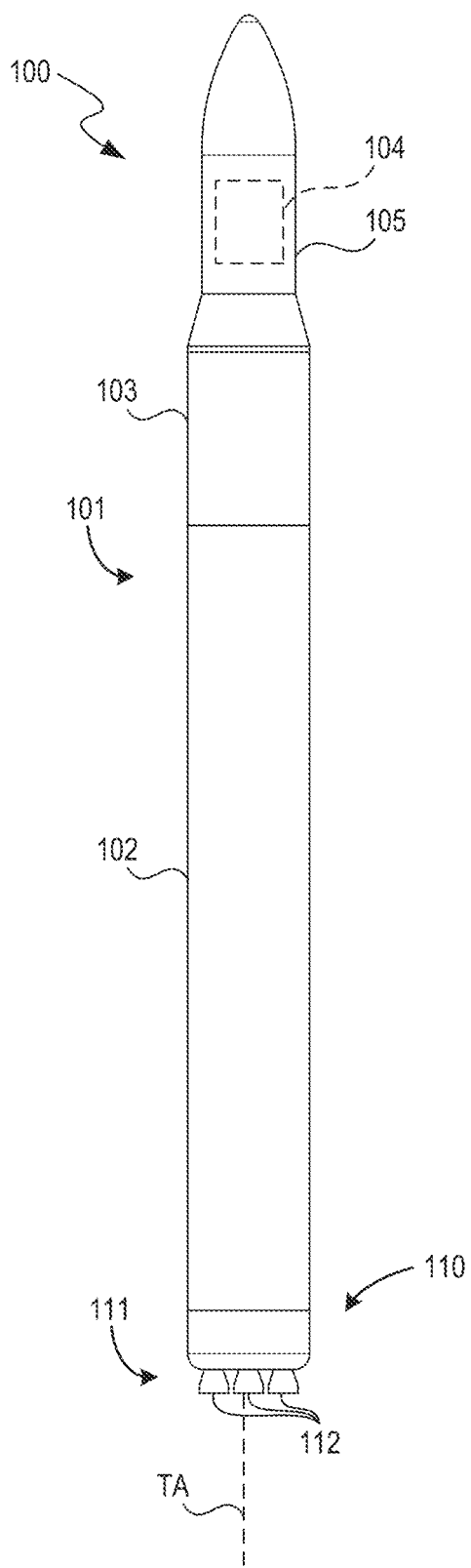
FIG. 1 is a partially schematic, side elevation view of a representative rocket on which seals in accordance with the present technology can be installed.

FIG. 1 is a partially schematic illustration of a representative system 100 configured in accordance with embodiments of the present technology. The system 100 can include a vehicle 101 (e.g., a launch vehicle) having a single or a multi-stage configuration. In the representative embodiment shown in FIG. 1, the vehicle 101 includes a first stage 102, a second stage 103, and a payload 104 (shown schematically in FIG. 1) surrounded by a fairing 105. The first stage 102 and the second stage 103 operate as boosters to direct the payload 104 into space. In other embodiments, the vehicle 101 can include a single booster, or more than two boosters. In any of these embodiments, at least one of the boosters (e.g., the first stage 102) is configured to be returned to Earth in a tail-down configuration, and is then reused on a subsequent launch.

The first stage 102 can include a propulsion system 110 that can in turn include one or more main engines 111 (positioned within the first stage 102). Each main engine 111 can include a corresponding nozzle 112. During launch, the main engines 111 provide the primary force directing the vehicle 101 upwardly. During a tail-down reentry, the thrust provided by the main engines 111 provides a braking force on the first stage 102 as it descends and lands in preparation for its next mission. In both cases, thrust is provided along a thrust axis TA, which can be adjusted, as discussed below, to steer or maneuver the vehicle 101.

Figure 2:
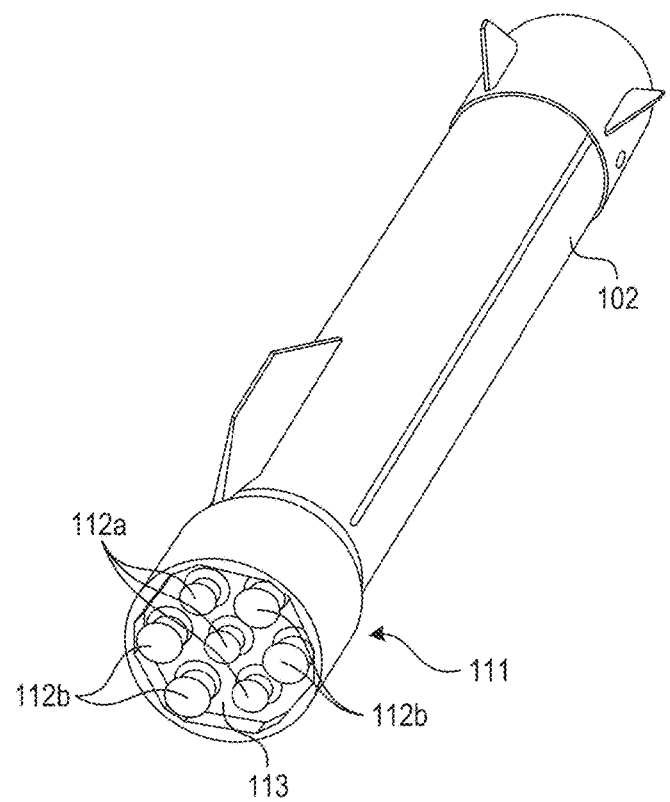
FIG. 2 is a partially schematic, bottom isometric view of a representative first stage of a rocket having both gimbalable and non-gimbalable engine nozzles, in accordance with embodiments of the present technology.

FIG. 2 is a partially schematic, bottom isometric illustration of the first stage 102 shown in FIG. 1, illustrating a base heat shield 113 that protects the lower portions of the first stage 102 from heat and aerodynamic forces encountered as the first stage 102 descends through the atmosphere. As is also shown in FIG. 2, one or more of the engine nozzles 112 can have a generally fixed or non-gimbalable configuration (four are indicated by reference numbers 112b), and/or one or more of the engines can have a gimbalable configuration (three are indicated by reference numbers 112a). As used herein, the term "gimbalable" refers to a device that is configured to gimbal in operation. The gimbalable engine nozzles 112a can pivot about one or more axes so as to vector the thrust produced by the corresponding engines and steer the vehicle 101 as it descends. The non-gimbalable engine nozzles 112b can provide thrust in a generally fixed direction. In some instances, the non-gimbalable engine nozzles 112b are referred to herein as "fixed" nozzles; however, it will be understood that even the "fixed" nozzles change position with respect to the base heat shield 113, e.g., as a result of thermal expansion and contraction, and/or structural deformation. Accordingly, the seals of the present technology can operate to seal the gaps between the base heat shield and (a) the gimbalable engine nozzles 112a, and/or (b) the non-gimbalable engine nozzles 112b. In general, the same seal can be used for both types of engine nozzles. However, in some instances, a representative first stage 102, such as the one shown in FIG. 2, may include multiple, different types of seals, one for the gimbalable engine nozzles 112a, and another for the non-gimbalable engine nozzles 112b.

Figure 3:
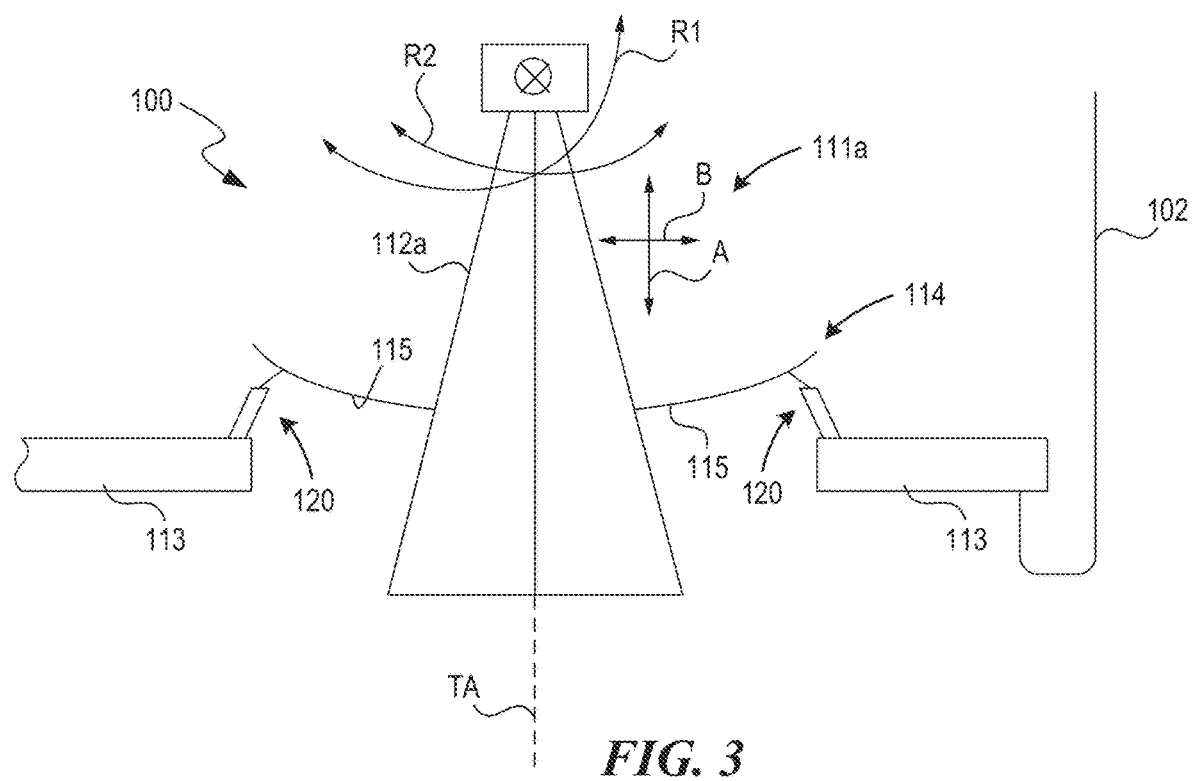
FIG. 3 is a partially schematic, cross-sectional side view of a gimbalable engine and nozzle, having a seal arrangement configured in accordance with embodiments of the present technology.

FIG. 3 is a partially schematic, cross-sectional illustration of a gimbalable engine 111a and associated gimbalable nozzle 112a. The nozzle 112a projects downwardly through a corresponding opening in the base heat shield 113, and can rotate relative to the first stage 102 about one or more axes. For example, the gimbalable nozzle 112a can rotate about two axes transverse to the thrust axis TA, as indicated by arrows R1 and R2. In addition, the gimbalable nozzle 112a can translate, in a generally vertical direction as indicated by arrow A, and/or in a generally horizontal or lateral direction as indicated by arrow B. This translational movement can apply as well to the non-gimbalable engine nozzles 112b shown in FIG. 2.

As is also shown in FIG. 3, the system 100 can include a seal plate 114 extending outwardly from the nozzle 112a. The seal plate 114 can have a downwardly facing sealing surface 115, which can have a curved (e.g., spherical) shape for a gimbaling nozzle, and a curved, flat, or other suitable shape for a non-gimbaling nozzle. One or more seals 120 can include flaps that contact the sealing surface 115 so as to at least reduce the penetration of hot gases upwardly into the internal spaces of the first stage 102, as the first stage 102 descends. This in turn reduces or eliminates damage to the first stage 102, which in turn reduces the time and cost required to refurbish the first stage 102 for a subsequent flight. Further details of representative seals and associated advantages, including advantages related to refurbishment, are described below with reference to FIGS. 4A-8F.

Figure 4A:
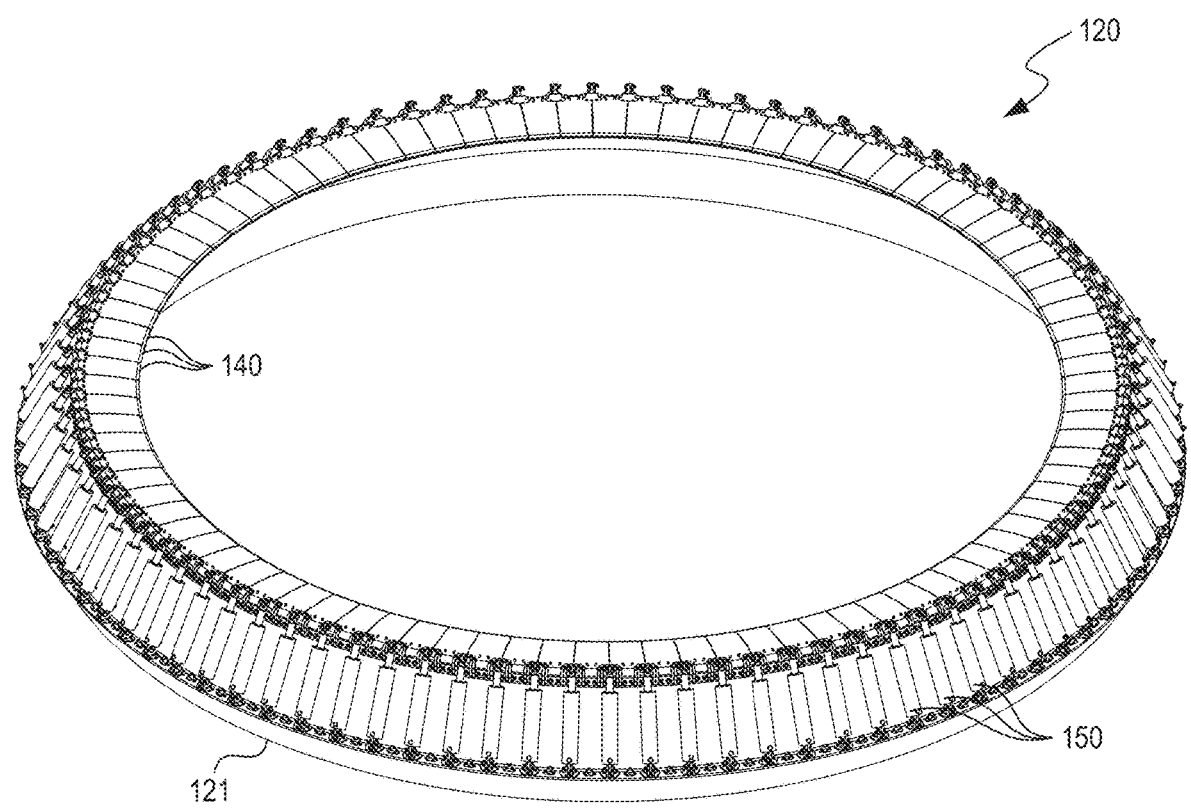
FIG. 4A is a partially schematic, isometric view of a seal configured to interface with a gimbalable nozzle in accordance with embodiments of the present technology.

FIG. 4A is a partially schematic illustration of a representative seal 120 having a circular seal support 121 that carries multiple flaps 140. The flaps contact the sealing surface 115 of the nozzle 112a, as discussed above with reference to FIG. 3. The seal 120 can further include one or more forcing elements 150 that force or bias the flaps into contact with the sealing surface, as is described in further detail below.

Figure 4B:
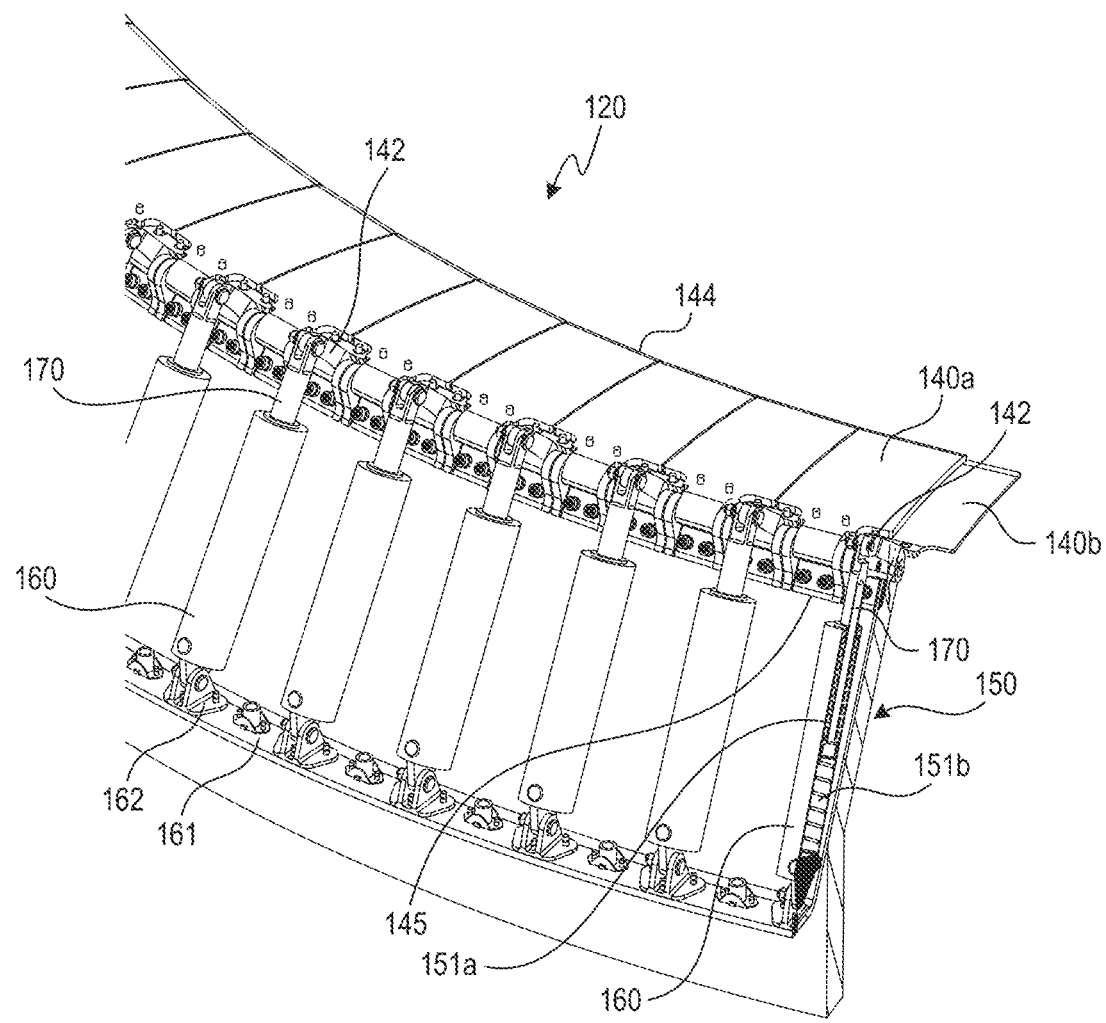
FIG. 4B is a partially schematic, enlarged view of a portion of the seal shown in FIG. 4A.

FIG. 4B is an enlarged view of a portion of the seal 120 shown in FIG. 4A. As shown in FIG. 4B, the flaps 140 can include a first flap 140a and a second, underlying flap 140b. An individual first flap 140a can be paired with a corresponding individual second flap 140b. The edges of the first and second flaps 140a, 140b can be offset from each other to provide a baffling and/or shingling effect, and thereby reduce leakage at the seal 140.

Each pair of first and second flaps 140a, 140b can be driven by a corresponding forcing element 150. The first flap 140a has a contact surface 144 that engages with the sealing surface 115 of the engine nozzle (FIG. 3). The second flap 140b protects the first flap 140a from the elevated temperatures and pressures encountered during reentry. For example, in some embodiments, the temperatures behind the bow shock produced by the descending first stage 102 can reach 4,000° F. or more, and so the second flap 140b can be formed from, and/or can include, an extreme temperature metal, such as Haynes 230, and/or a carbon-carbon and/or ceramic matrix composite material.

In particular embodiments, the first flap 140a is generally thicker than the second flap 140b, and provides the structural strength required to withstand the pressure produced by the second flap 140b as the second flap 140b pushes against it. For example, the first flap 140a can be formed from, or can include, a material that retains its strength at high temperatures, such as Haynes 282 or Inconel 718. Accordingly, the first flap 140a can provide a mechanical sealing force with the sealing surface 115, and can provide support for the second flap 140b, while the second flap 140b provides thermal protection for the first flap.

In a representative embodiment, the first flap 140a has a thickness of 0.18 inches, and the second flap 140b has a thickness of 0.08 inches. In other embodiments, one or both of the foregoing flaps can have different dimensions, depending on factors including, but not limited to, the composition of the flaps, and/or the temperature and/or pressure of the environment in which the flaps operate. In general, the first flap 140a may be thicker than the second flap 140b so as to provide an enhanced structural function, while the second flap provides an enhanced heat shielding function.

In particular embodiments, the thicknesses of both the first and second flaps 140a, 140b are selected such that the flaps have sufficient capacity to absorb the heat to which they are subjected, without failing to function during the transient high temperature heat excursion that results during reentry. Because the temperature capabilities of the materials may be below the temperature of the surrounding gases, the design of the flaps may rely on the relatively short duration of the high temperature excursion. For longer duration reentries, one or more of the flaps can be made from a refractory metal (e.g., a molybdenum/zirconium/niobium alloy), and/or a carbon-carbon material, a ceramic material, and/or ceramic matrix composite. Because such materials are typically expensive and/or difficult to manufacture, using materials selected for the expected short-duration reentry can reduce overall costs.

In a further aspect of an embodiment shown in FIG. 4B (and described in greater detail with reference to FIG. 5), the forcing element 150 can operate on the second flap 140b to drive the first flap 140a upwardly into contact with the corresponding engine nozzle sealing surface. In a representative embodiment, the second flap 140b can include a drive portion 142, for example, a lever arm, that is acted upon by an actuator rod or piston 170. The actuator rod 170 can be housed in a cylinder or canister 160, which is in turn attached to a cylinder bracket 162 and carried by a cylinder support 161. The cylinder support 161 is attached to the seal support 120. Accordingly, the forcing element 150 can rotate or bias both the second flap 140b and the first flap 140a in an upward direction. The flaps 140a, 140b are rotatably supported by flap brackets 145.

The forcing element 150 can include one or more springs that bias or force the second flap 140b in one or more directions. For example, the forcing element 150 can include a first spring 151a that biases the second flap 140b in an upward direction. The forcing element 150 can further include a second spring 151b that prevents the second flap 140b from overextending (e.g., over-rotating) in the same direction, for example, if the seal assembly is positioned on its side rather than in the horizontal orientation shown in FIG. 4B.

Figure 5:
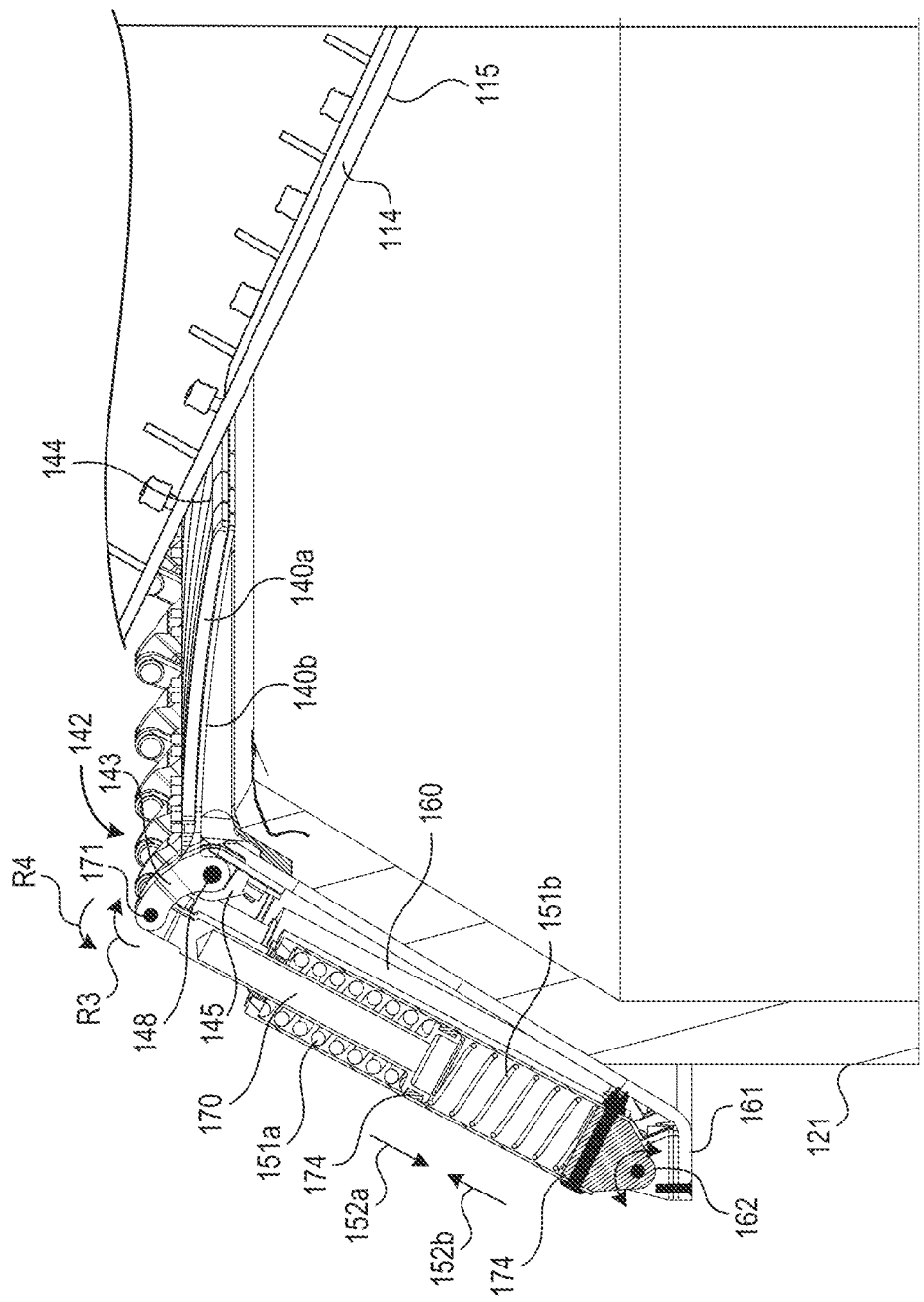
FIG. 5 is a partially schematic, cross-sectional illustration of a portion of a seal configured in accordance with embodiments of the present technology.

FIG. 5 is a partially cut-away, partially schematic illustration of the arrangement shown in FIG. 4B. The first and second flaps 140a, 140b are attached to a flap bracket 145 via one or more flap hinge pins 148. Accordingly, both first and second flaps 140a, 140b pivot about the same axis (or, as shown in the Figures slightly different axes) relative to the seal support 121. The second flap 140b, which is positioned below the first flap 140a, includes the drive portion 142, e.g., a driver arm 143, that extends away from the flap hinge pin 148. The actuator rod 170 is attached to the driver arm 143 via an actuator hinge pin 171. The coils of the first spring 151a are normally spaced slightly apart (when no force is applied to the first spring 151a), and the first spring 151a rests on an actuator base 174 of the actuator rod 170. Accordingly, the first spring 151a has a first spring bias direction 152a. If the seal plate 114 moves downwardly against the first flap 140a, the driver arm 143 tends to rotate clockwise, as indicated by arrow R3. The first spring 151a resists this motion to force the second flap 140b upwardly against the first flap 140a into contact with the sealing surface 115.

The second spring 151b can be attached to the actuator base 174 to push the actuator rod 170 in an opposite, second spring bias direction 152b. Accordingly, if the entire seal assembly is rotated counterclockwise, the weight of the first and second flaps may cause them to "flop over" and rotate the driver arm 143 counterclockwise, as indicated by arrow R4, causing the actuator base 174 to separate from the first spring 151a and move toward the bottom of the cylinder 160. The second spring 151b can prevent this from occurring, which facilitates removing and reinstalling the base heat shield and/or nozzle between missions.

Figure 6:
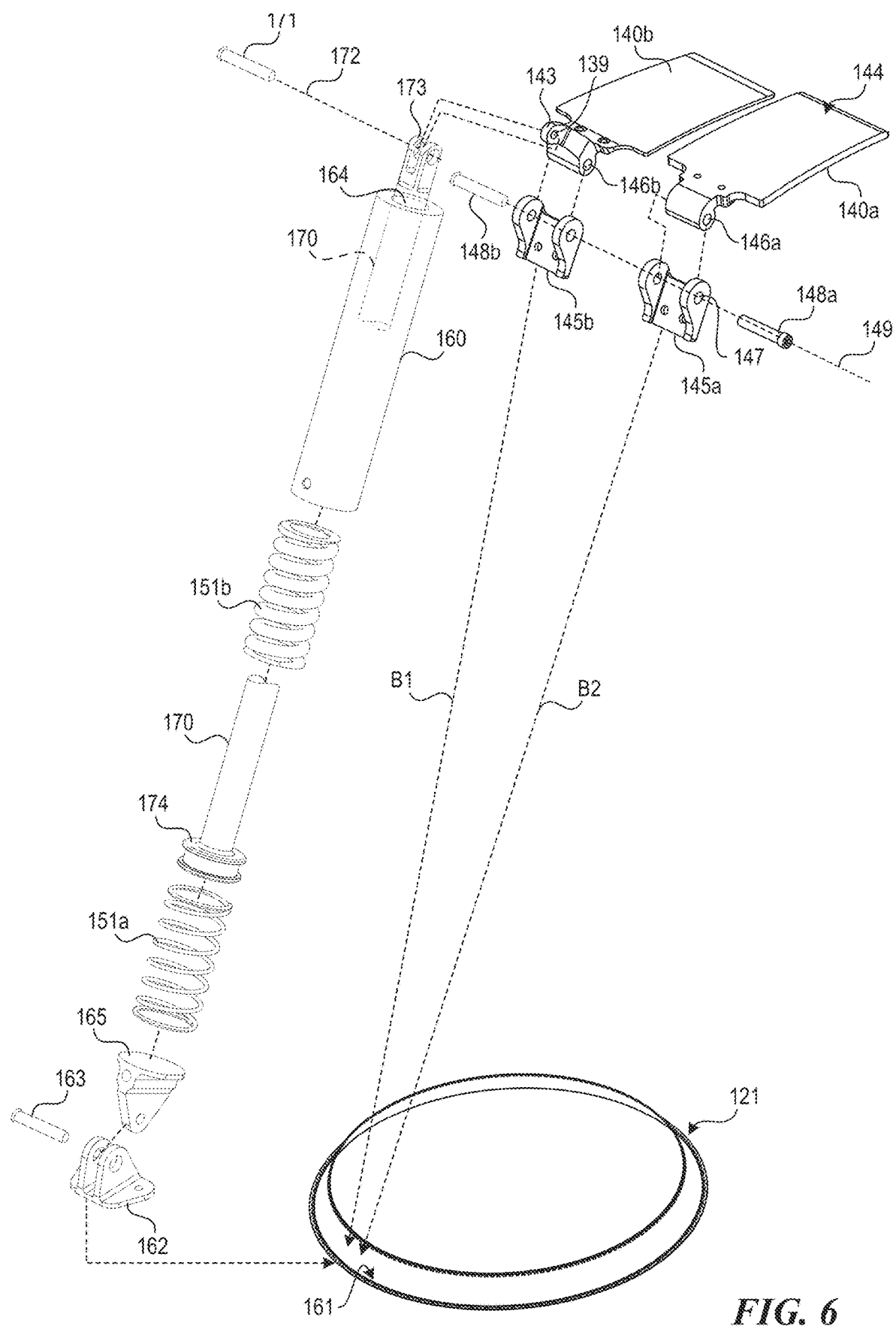
FIG. 6 is an exploded view of representative components of the seal shown in FIG. 5.

FIG. 6 is a partially schematic, exploded view of several of the components described above with reference to FIGS. 4B and 5. The first flap 140a includes a flap aperture 146a that is positioned between bracket apertures 147 of a first flap bracket 145a. A first flap hinge pin 148a passes through the bracket apertures 147 and the flap aperture 146a to allow the first flap 140a to rotate about the flap hinge axis 149. A second flap hinge pin 148b extends into the corresponding flap aperture 146b of the second flap 140b, so that both the first and second flap rotate about the same (or approximately the same) flap hinge axis 149. In other embodiments, a single hinge pin can extend through both the first and second flaps 140a, 140b.

The second flap 140b includes the driver arm 143, which is attached to the actuator rod 170 via an actuator hinge pin 171 that passes through an actuator aperture 173 at the upper end of the actuator rod 170, and into a corresponding aperture 139 of the driver arm 143. Accordingly, the actuator rod 170 (which is shown broken into two sections, for purposes of illustration) can rotate relative to the second flap 140b about an actuator hinge axis 172, as the actuator rod 170 moves upwardly and downwardly.

The actuator rod 170 is housed, in part, within the cylinder 160. The first spring 151a fits around the actuator rod 170 and rests on the actuator base 174. The actuator rod 170 extends outwardly from the cylinder 160 through an aperture 164. The first spring 151a is captured within the cylinder 160 between the upper end of the cylinder 160, and a base 174 of the actuator rod 170. The second spring 151b fits between a base 165 of the cylinder 160 and the actuator base 174. A cylinder hinge pin 163 pivotably couples the cylinder 160 to the cylinder bracket 162, which is in turn attached to the cylinder support 161 of the seal support 121. The corresponding flap brackets 145a, 145b are also attached to the seal support 121, as indicated by arrows B1 and B2, at a position above the cylinder bracket 162.

Figure 7A:
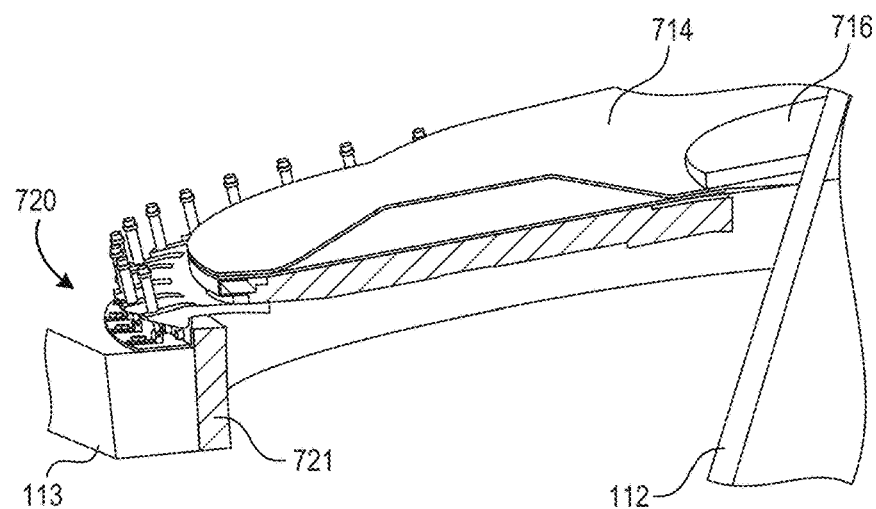
FIGS. 7A-7C illustrate a seal configured in accordance with further embodiments of the present technology.
Figure 7B:
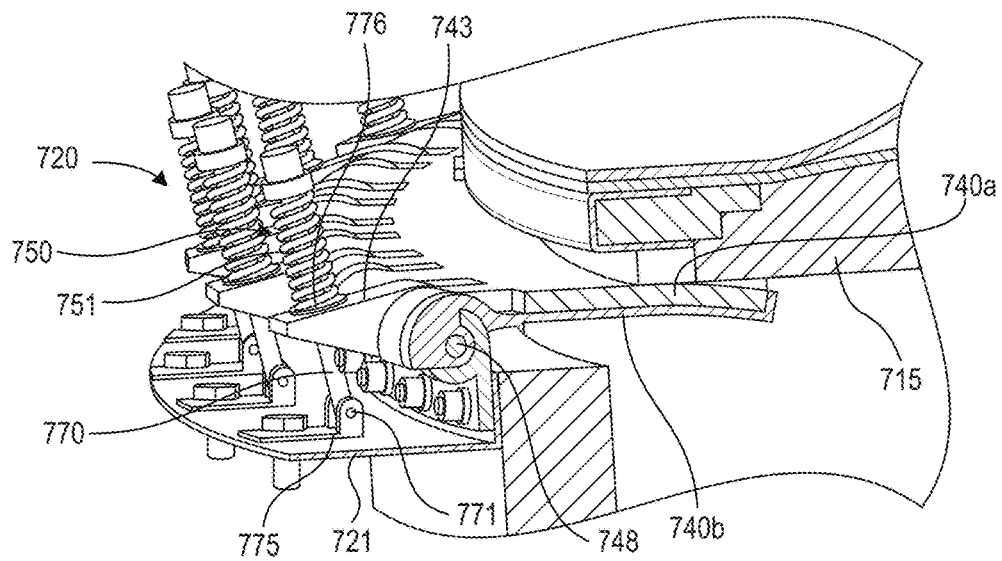
Figure 7C:
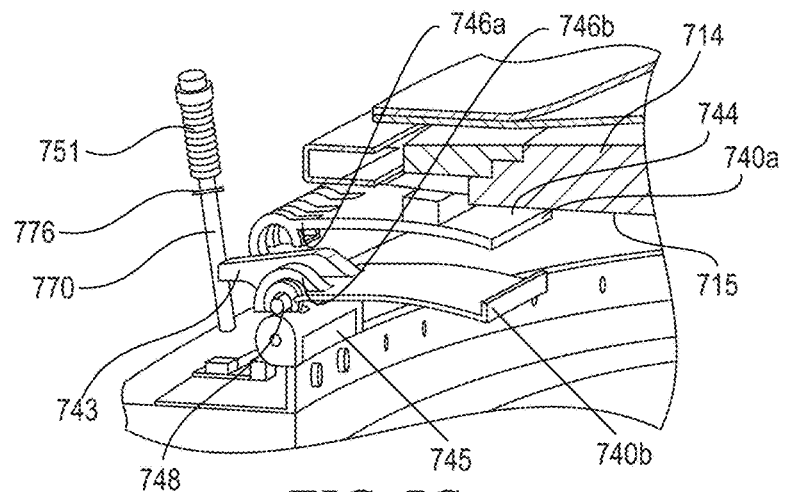

FIGS. 7A-7C illustrate a sealing arrangement in accordance with another representative embodiment of the present technology, suitable for both a non-gimbalable nozzle 112b (FIG. 2) and a gimbalable nozzle 112a. Referring first to FIG. 7A, the representative nozzle 112 can have a flange 716, which in turn carries a seal plate 714 extending outwardly from the nozzle 112. The seal plate 714 can be generally flat, as shown in FIG. 7A, or curved (e.g., spherical). A seal 720, including a seal support 721, can be positioned circumferentially around the nozzle 112 to seal the interface between the base heat shield 113 and the seal plate 714.

Referring next to FIG. 7B, the seal 720 can include a first flap 740a positioned above a second flap 740b, each of which can pivot about a common flap hinge pin 748, or two corresponding flap hinge pins. The second flap 740b can include a driver arm 743 that is connected to an actuator rod 770. The actuator rod 770 extends through an aperture in the driver arm 743, and connects to the support 721 via an actuator bracket 775, and an actuator hinge pin 771. Accordingly, the actuator rod 770 can pivot about the hinge pin 771, as the driver arm 743 pivots about the flap hinge pin 748.

The seal 720 can further include a forcing element 750, e.g., a spring 751, that bears against a retainer 776, which in turn bears against the driver arm 743. If the first and second flaps 740a, 740b rotate clockwise around the flap hinge pin 748, the spring 751 forces them counterclockwise, into contact with the corresponding sealing surface 715 of the seal plate 714.

FIG. 7C is a partially schematic, exploded view of several of the components shown in FIG. 7B. As shown in FIG. 7C, the first flap 740a includes a contact surface 744 that sealably engages with the sealing surface 715 of the seal plate 714. The second flap 740b provides heat protection for the first flap 740a, and is biased upwardly against the first flap 740a via the spring 751 and actuator rod 770. Each flap 740a, 740b includes a corresponding aperture 746a, 746b to receive the flap hinge pin 748.

Figure 8A:
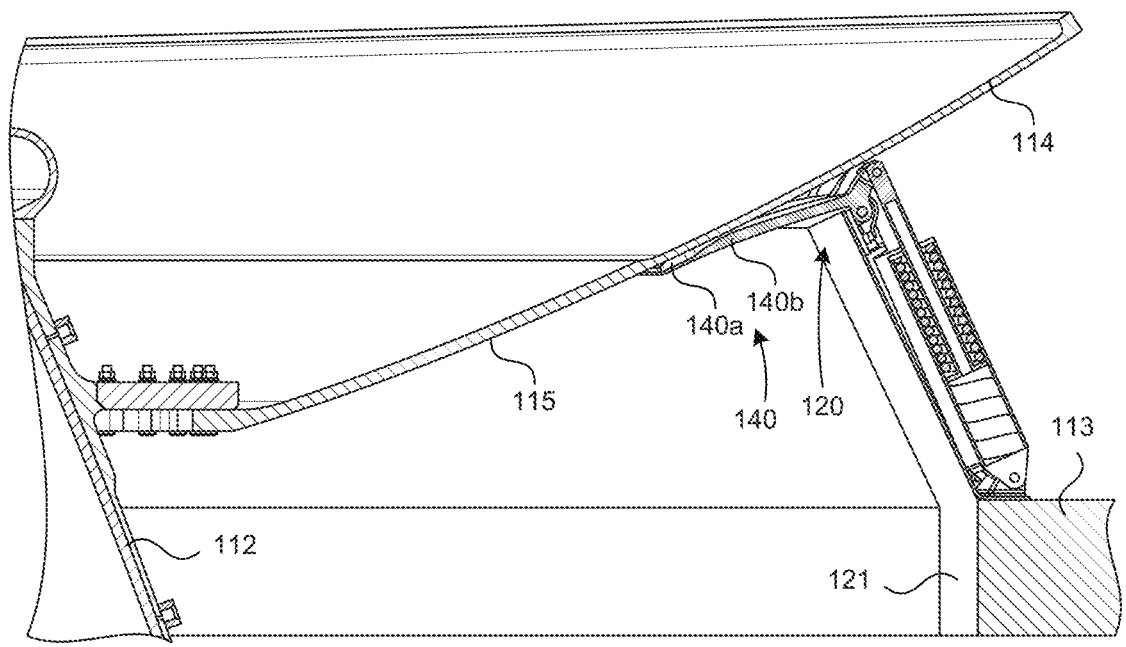
FIGS. 8A-8F illustrate the motion of representative seal flaps during normal operation, and during a removal process, in accordance with embodiments of the present technology.
Figure 8B:
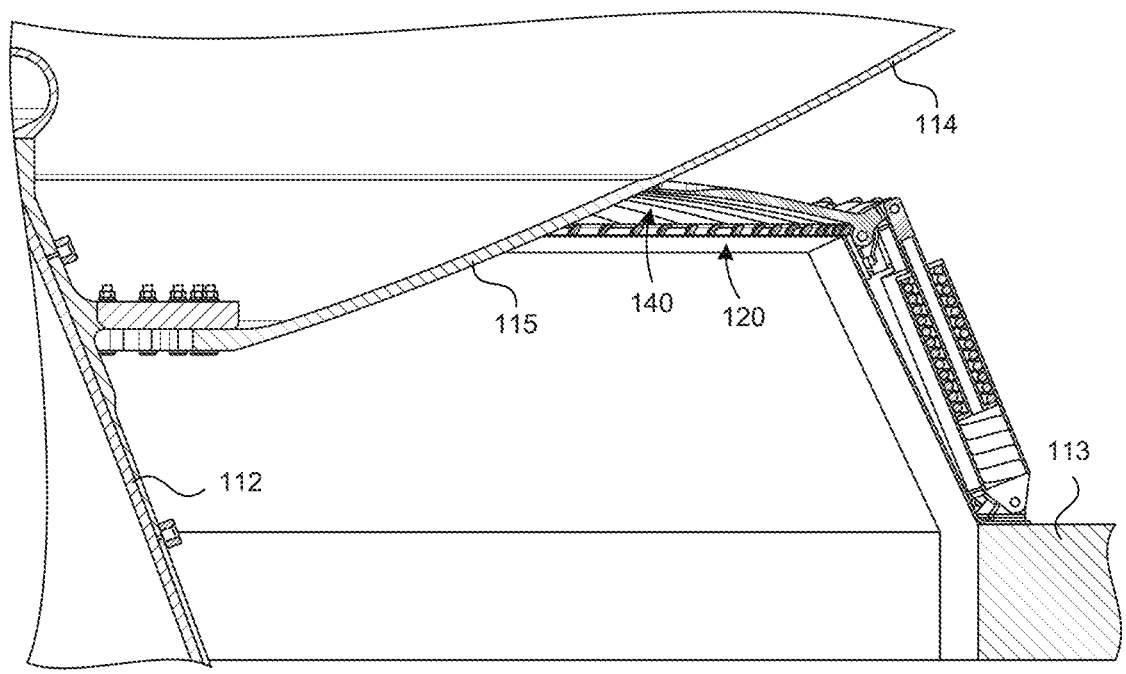
Figure 8C:
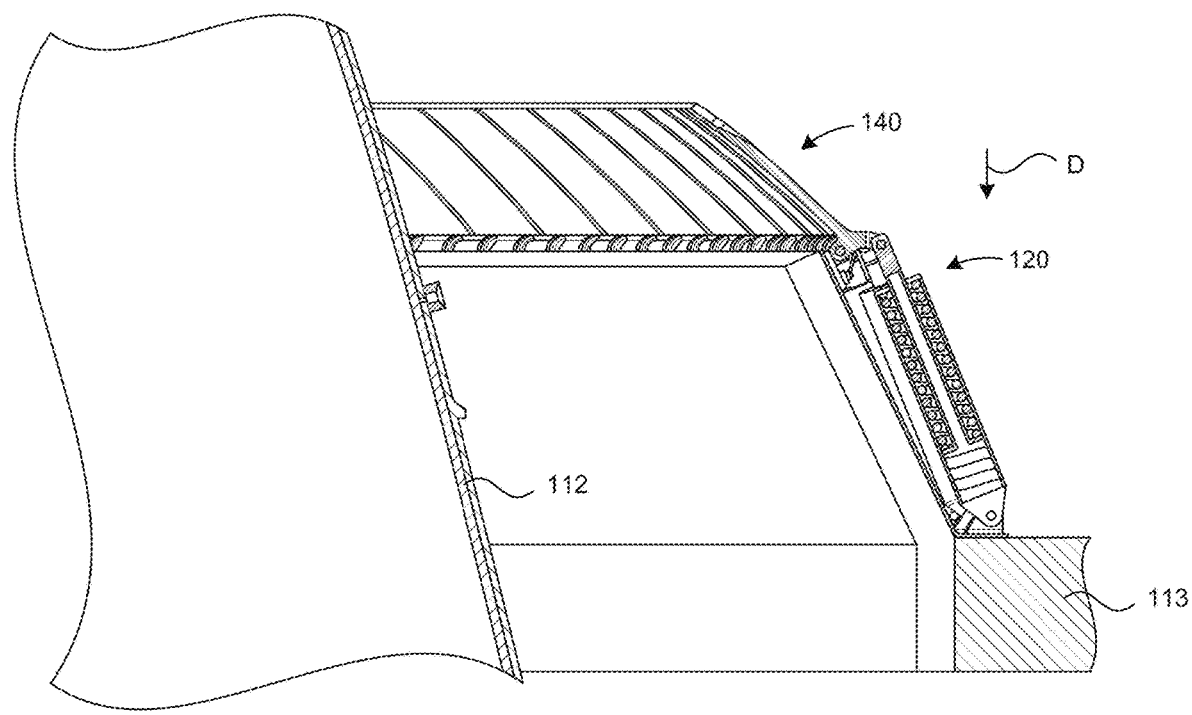

FIGS. 8A and 8B illustrate the motion of a representative set of flaps 140 (e.g., multiple pairs of first and second flaps 140a, 140b), as the nozzle 112 moves upwardly and downwardly during normal operation. The seal 120 can have a configuration similar to that shown in FIG. 5. Or the seal 120 can have another suitable configuration, for example, that shown in FIGS. 7A-7C. In any of these embodiments, and as shown in FIG. 8A, the nozzle 112 and the seal plate 114 have moved downwardly, and the flaps 140a, 140b have followed that motion, maintaining a seal with the sealing surface 115 of the seal plate 114. In FIG. 8B, the nozzle 112 has moved upwardly, and the flaps 140 have maintained contact with the sealing surface 115 of the seal plate 114.

Figure 8D:
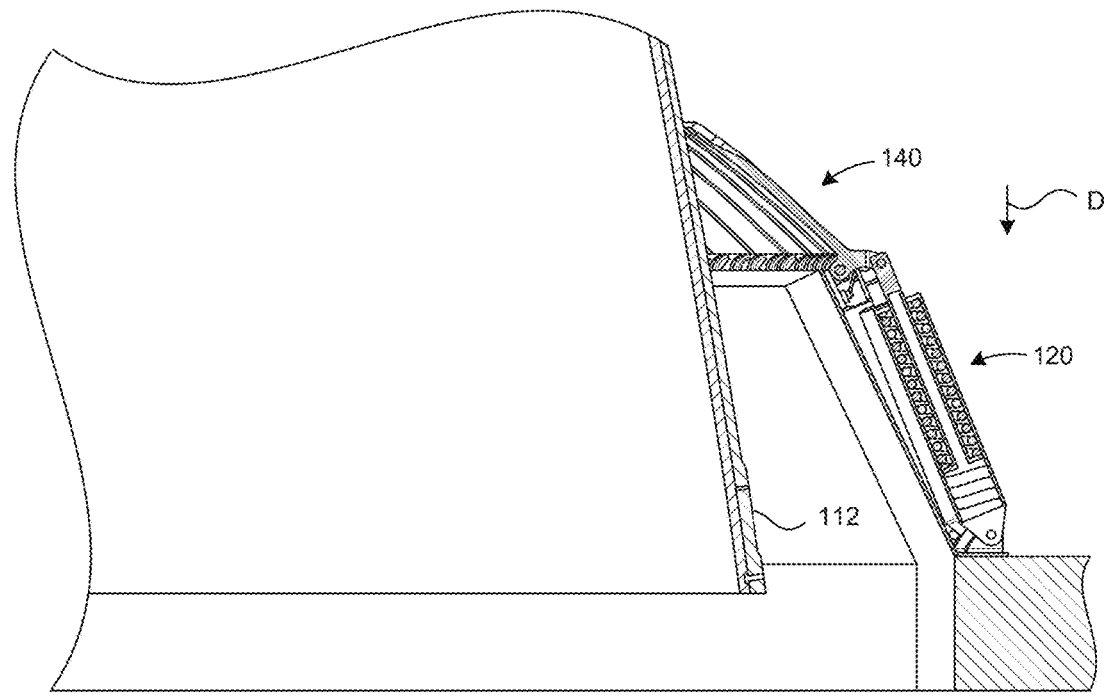
Figure 8E:
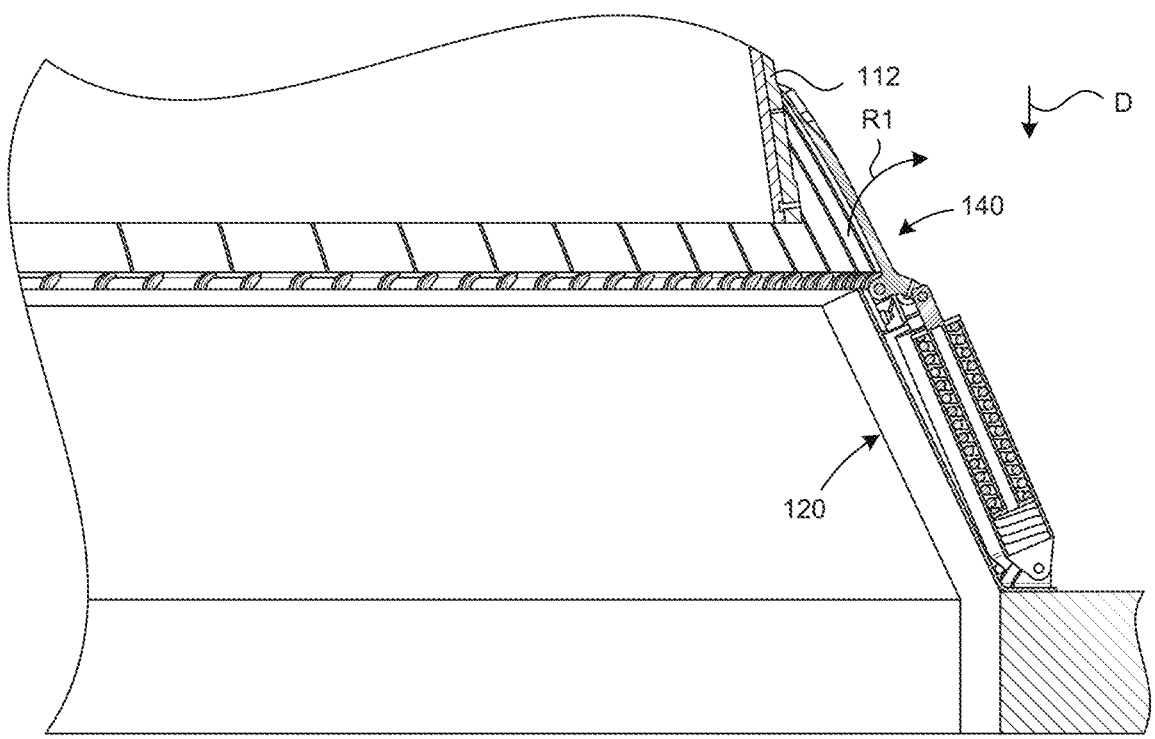
Figure 8F:
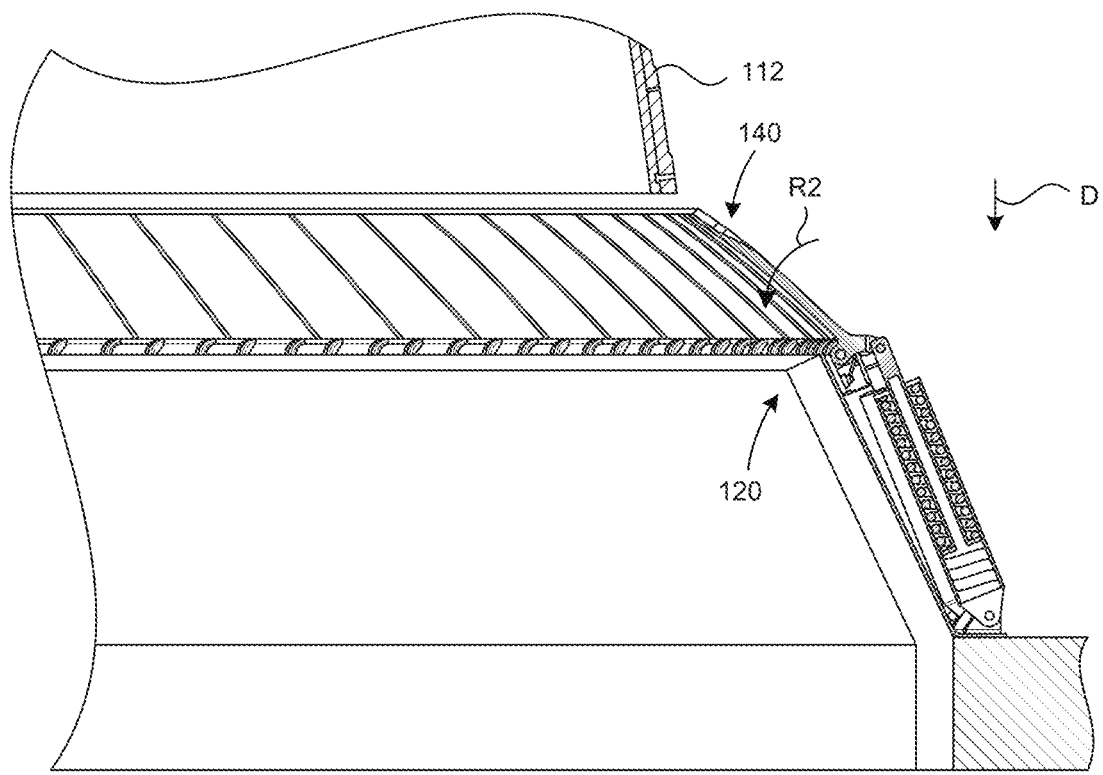

The seal 120 can also be configured to accommodate much more significant motion relative to the nozzle 112, for example, when the base heat shield 113 of the rocket is removed for refurbishment, and/or to access propulsion system components and/or other components that are protected by the base heat shield 113 and the seal 120. For example, referring now to FIG. 8C, the base heat shield 113, with the seal 120 attached, has been moved downwardly from the seal plate 114 (FIG. 8B), as indicated by arrow D. As the base heat shield 113 continues to move downwardly, the flaps 140 come into contact with the outer surface of the nozzle 112, as is shown in FIG. 8D. Because the flaps 140 are hinged, they can rotate outwardly as the flared outer surface of the nozzle 112 passes by. This is illustrated in FIG. 8E, which shows the flaps 140 rotating outwardly (as indicated by arrow R1) to allow the nozzle 112 to pass. Once the open end of the nozzle 112 has cleared the flaps 140, as shown in FIG. 8F, the flaps 140 return to their neutral position under the biasing force of the associated springs, as indicated by arrow R2.

When the base heat shield 113 is to be replaced, an optional dilating tool (not shown) can be used to rotate the flaps 140 outwardly, as indicated by arrow R1 in FIG. 8E, thus allowing the base heat shield 113 and the seal 140 to be moved upwardly over the open end of the nozzle 112. Once the seal 120 is over the end of the nozzle 112, the dilating tool can be removed, the flaps 140 can return to their neutral positions, and the base heat shield 113 can be moved further upwardly for attachment to the rocket, reversing the steps described above with reference to FIGS. 8C-8D.

While the discussion above described the base heat shield as being moved downwardly relative to the nozzle, in at least some embodiments, the rocket can be positioned horizontally, and the base heat shield can be removed and replaced via a lateral motion. As discussed above, the arrangement of springs can both bias the flaps into contact with the associated sealing surface, and prevent the flaps from over-rotating from their neutral positions, even when the rocket is positioned horizontally. This arrangement can prevent the flaps 140 from interfering with the nozzle when the base shield is reinstalled.

An advantage of the foregoing arrangement is that the process of removing the base heat shield (for improved access to the nozzle and/or components within the rocket) can be performed without damaging the seal. This approach, alone or together with other elements of the present technology, can facilitate repeated rocket launches and landings, without the need to replace the seal. In addition, the process of refurbishing the seal and/or the base shield is simplified when these components are removed from the rocket. And while these components may undergo refurbishment between launches, it is expected that the seal and base heat shield will remain viable for many launch/landing cycles.

Other features of embodiments of the present technology related to refurbishment and longevity include the hinged nature of the seal, which allows the seal to be made of metal. Conventional high temperature seals typically use a protective material that is ablative and/or is otherwise suitable for one use only, and accordingly must be replaced after each use. Embodiments of the present technology avoid this issue. Accordingly and more generally, a feature of several of the embodiments described above with reference to FIGS. 1-8F is that the seal arrangements are reusable. In particular, the seals are designed to withstand the forces and temperatures associated with multiple launches, landings, and recovery operations.

Another feature of several of the embodiments described above is that they can include forcing elements that in turn include simple springs or other passive elements. An advantage of this feature is that such elements are less likely to fail and more likely to withstand the rigors of multiple launch and landing operations.

From the foregoing, it will be appreciated that specific embodiments of the disclosed technology have been described herein for purposes of illustration, but that various modifications may be made without deviating from the technology. For example, in some embodiments described above, one flap of a flap pair is driven, and in turn drives the other flap of the flap pair. The driven flap can be located below an overlapping flap, or the positions can be reversed. In other embodiments, both flaps may be driven. As another example, the materials and material thicknesses may be different than those described above. The system can include biasing mechanisms different than the spring arrangements described above. Certain aspects of the technology described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the disclosure and associated technology can encompass other embodiments not expressly shown or described herein.

As used herein, the terms "generally" and "approximately" refer to values or characteristics within a range of ±10% from the stated value or characteristic, unless otherwise indicated.

We claim:

1. A rocket propulsion system, comprising:
a rocket engine having an exhaust nozzle;
a seal plate extending outwardly from the exhaust nozzle; and
a seal engaged with the seal plate, the seal including:
at least one support positioned outwardly from the exhaust nozzle;
multiple pivotable first flaps, with an individual one of the first flaps carried by the at least one support, pivotable about a first hinge rotatable about at least a first pin, and positioned to contact the seal plate;
multiple pivotable second flaps, with an individual one of the second flaps pivotable about a second hinge rotatable about at least a second pin and positioned to shield the individual one of the first flaps; and
at least one forcing element operatively coupled to the individual one of the first flaps or the individual one of the second flaps, or both, to apply a pivoting force to the individual one of the first flaps or the individual one of the second flaps.

2. The system of claim 1 wherein the at least one forcing element is operatively coupled to the individual one of the second flaps to bias the individual one of the second flaps into contact with the individual one of the first flaps.

3. The system of claim 1 wherein the individual one of the first flaps has a higher rigidity than the individual one of the second flaps.

4. The system of claim 1 wherein the individual one of the first flaps or the individual one of the second flaps, or both, includes a carbon-carbon material.

5. The system of claim 1 wherein the individual one of the second flaps has a higher heat resistance than the individual one of the first flaps.

6. The system of claim 1 wherein the individual one of the first flaps or the individual one of the second flaps, or both, includes a ceramic or ceramic matrix composite material.

7. The system of claim 1 wherein the at least one forcing element includes a spring coupled to the individual one of the first flaps or the individual one of the second flaps via an actuator rod.

8. The system of claim 7 wherein the spring is a first spring, and wherein the system further comprises:
   a second spring coupled to the actuator rod, with the first spring positioned to bias the actuator rod in a first axial direction, and the second spring positioned to bias the actuator rod in a second direction opposite the first direction; and
   a canister housing the first spring, the second spring, and the actuator rod.

9. The system of claim 1 wherein at least a portion of the seal plate engaged by the seal is spherical.

10. The system of claim 1 wherein at least a portion of the seal plate engaged by the seal is flat.

11. The system of claim 1 wherein the nozzle has a thrust axis and is gimbalable relative to the thrust axis.

12. The system of claim 1 wherein the nozzle has a thrust axis and is rotationally fixed relative to the thrust axis.

13. The system of claim 12 wherein the nozzle is axially movable along the thrust axis.

14. The system of claim 1 wherein the nozzle is:
   positioned to direct thrust along a thrust axis;
   axially moveable along the thrust axis;
   gimbalable about a first axis transverse to the thrust axis; and
   gimbalable about a second axis transverse to the thrust axis and the first axis.

15. A rocket propulsion system, comprising:
   a rocket engine having a gimbalable exhaust nozzle;
   a spherical seal plate carried by the exhaust nozzle; and
   a seal engaged with the seal plate, the seal including:
   at least one support;
   multiple flap pairs arranged circumferentially around the nozzle, each one of the flap pairs including:
   a first pivotable flap pivotable about a first hinge rotatable about at least a first pin and positioned to contact the seal plate;
   a second pivotable flap pivotable about a second hinge rotatable about at least a second pin and positioned to shield the first pivotable flap, wherein the first pivotable flap of one of the multiple flap pairs overlaps the second pivotable flap of a neighboring one of the multiple flap pairs;
   an actuator rod coupled to the second pivotable flap;
   a first spring coupled to the actuator rod to bias the second pivotable flap in a first rotary direction;
   a second spring coupled to the actuator rod to bias the second pivotable flap in a second rotary direction opposite the first rotary direction; and
   at least one support carrying the first and second pivotable flaps.

16. The system of claim 15 wherein the first spring, the second spring, and the actuator rod are housed, at least in part, in a cylinder, and wherein the cylinder is pivotably carried by the at least one support.

17. The system of claim 15 wherein multiple spring pairs are positioned circumferentially around the nozzle.

18. A seal for a rocket engine, comprising:
   at least one support positioned outwardly from an exhaust nozzle;
   multiple, pivotable first flaps, each having a sealing surface, with an individual one of the first flaps carried by the at least one support and pivotable about a first hinge rotatable about at least a first pin;
   multiple, pivotable second flaps, with an individual one of the second flaps (i) pivotable about a second hinge rotatable about at least a second pin and (ii) positioned to shield the individual one of the first flaps; and
   at least one forcing element operatively coupled to the individual one of the first flaps or the individual one of the second flaps, or both, to apply a pivoting force to the individual one of the first flaps or the individual one of the second flaps.

19. The seal of claim 18 wherein the at least one forcing element includes a spring coupled to the individual one of the first flaps or the individual one of the second flaps via an actuator rod.

20. The seal of claim 19 wherein the spring is a first spring, and wherein the forcing element further comprises:
   a second spring coupled to the actuator rod, with the first spring positioned to bias the actuator rod in a first axial direction, and the second spring positioned to restrict motion of the actuator rod in a second direction opposite the first direction; and
   a canister housing the first spring, the second spring, and the actuator rod.

* * * * *